United States Patent [19]

Short

[11] Patent Number: 5,735,628

[45] Date of Patent: Apr. 7, 1998

[54] ROPE END TERMINATION DEVICE

[75] Inventor: Brian Malcolm Short, Mottingham, United Kingdom

[73] Assignee: Bridon PLC, United Kingdom

[21] Appl. No.: 294,591

[22] Filed: Aug. 23, 1994

[51] Int. Cl.$^6$ .................................................. F16B 2/02
[52] U.S. Cl. .......................... 403/218; 403/296; 403/314; 403/374
[58] Field of Search ................................. 403/218, 296, 403/309, 310, 311, 314, 334, 344, 354, 374

[56] References Cited

U.S. PATENT DOCUMENTS 3,570,074  3/1971  Schimmeyer .

FOREIGN PATENT DOCUMENTS

| WO 87/04573 | 7/1987  | European Pat. Off. . |
| 247 559     | 10/1926 | United Kingdom . |
| 1213 380    | 11/1970 | United Kingdom . |
| 134 1013    | 4/1971  | United Kingdom . |
| 2224 757A   | 5/1990  | United Kingdom . |
| 2236 546 A  | 8/1991  | United Kingdom . |

*Primary Examiner*—Anthony Knight
*Assistant Examiner*—Bruce A. Lev
*Attorney, Agent, or Firm*—Haynes and Boone

[57] ABSTRACT

A device and a method for terminating a rope or a bundle of ropes. The device comprises a housing member having a frusto-conical bore for accommodating hollow member which, in use, wedgedly retain rope ends or rope end portions within the housing. The hollow members are located in juxtaposed relationship within the housing, each hollow member having a conically shaped member which traps a rope end or rope end portion within its respective hollow member. The device is designed for terminating ropes of large diameter or bundles of ropes which collectively have a large diameter. The device is shaped or has means to enable it to be secured to a fixture such as a seabed anchorage. The device may, however, be provided as a means of connecting two ropes of large diameter and as such comprises two of the rope end terminating devices fixed in back to back relationship.

9 Claims, 3 Drawing Sheets

ROPE END TERMINATION DEVICE

BACKGROUND OF THE INVENTION

The present invention relates to a rope end termination device.

Rope end termination devices of the type consisting of a socket, at least part of an inner wall of which is tapered, and a conically shaped member which fits within the socket to wedgedly retain rope end filaments in a space between the conically shaped member and the tapered inner wall are disclosed in United Kingdom patent No. 1341013 and United Kingdom patent publication No. 2236546A. Rope end termination devices of this type (hereinafter referred to as rope end termination devices of the type aforesaid) are primarily provided for terminating fibre ropes, particularly of the braided filament type.

Fibre ropes are increasingly being employed in deep water applications because of their good strength characteristics, and better weight to length ratio than steel ropes. In deep water applications such as the mooring of a petroleum production platform, for example, ropes having a diameter up to 250 millimeters and a length up to 2000 meters are required. A fibre rope having a diameter of 250 millimeters has a relatively large weight to length ratio. A rope of this diameter can only be provided in such lengths if manufactured at the point of use, which in deep water environments is impracticable. Alternatively, it is possible to transport to the point of use a number of shorter lengths of rope of the required diameter to be connected end to end to provide the desired length. However, problems are encountered in terminating the ends of adjacent sections of rope for connecting together.

The dimensions of a rope end termination device of the type aforesaid are generally dictated by the diameter of the rope to be terminated. For example, for a 50 mm diameter rope, the length of a termination device socket would typically be 400 mm and the length of a conically shaped member for insertion in the socket would typically be 190 mm. Terminating a rope end using such a device is normally a manual task. It will be readily appreciated therefore that this task becomes increasingly physically difficult for ropes having diameters considerably greater than 50 mm. In deep water applications where ropes having a diameter up to 250 mm are required, a rope end termination device of the type aforesaid for terminating such a rope would be so large as to render it physically impossible to manually terminate the rope with said device.

SUMMARY OF THE INVENTION

An object of the present invention is to obviate and mitigate the aforesaid disadvantages.

According to one aspect of the present invention there is provided a rope end termination device comprising a housing member formed with a generally frusto-conical bore therethrough, within which a plurality of generally frusto-conical hollow members are located for receiving, in use, rope ends or rope end portions, wherein the frusto-conical hollow members are located in juxtaposed relationship within the bore of the housing with the rope ends or rope end portions being wedgedly retained therein.

Each of said rope ends or rope end portions may be wedgedly retained in a space between a generally conically shaped member located within a respective hollow member and a tapered inner wall of said member.

The included angle of each frusto-conical hollow member is preferably less than the included angle of the frusto-conical bore of the housing member.

Preferably, the included angles of the frusto-conical members are equal, and may be such that when said members are arranged in juxtaposed relationship within the bore of the housing member, each of the members in contact with an inner wall of the bore contact said inner wall along a line of contact extending over a substantial portion of their length.

An external surface of the housing member may be shaped so as to be locatable within a fixture means, for example a seabed anchorage or mooring station.

Preferably, the external surface of the housing member generally defines a sphere.

Alternatively, the housing member may include fixture means for attachment to a fixture.

The housing member may include at one end thereof means to enable a housing cap member including fixture means to be affixed thereto.

According to a second aspect of the present invention there is provided a method of terminating a rope or a bundle of ropes comprising: passing said rope or bundle of ropes through a generally frusto-conical bore of a housing member; positioning about the end of each rope end portion or rope end a generally frusto-conical hollow member and inserting into said hollow member a generally conically shaped member to wedgedly retain said rope end portion or rope end in said hollow member; and withdrawing said rope or bundle of ropes through said bore in order to locate said hollow members terminating said rope end portions or rope ends in juxtaposed relationship within the bore of said housing member.

According to a third aspect of the present invention there is provided a rope or a bundle of ropes terminated in accordance with the method of the preceding paragraph.

According to a fourth aspect of the present invention there is provided an intermediate connector device for a rope and/or a bundle of ropes comprising two housing members including means for securing said members together in back to back relationship, wherein each housing member is formed with a generally frusto-conical bore therethrough, within which a plurality of frusto-conical hollow members are located for receiving, in use, rope ends or rope end portions, wherein the frusto-conical hollow members are arranged in juxtaposed relationship within the bore of their respective housing with the rope ends or rope end portions being wedgedly retained therein.

BRIEF DESCRIPTION OF THE DRAWINGS

The foregoing further features of the present invention will be more readily understood from the following description of preferred embodiments thereof with reference to the accompanying drawings, of which:

Referring to the drawings, FIG. 1 shows a cross-sectional view of a first embodiment of a rope end termination device 10 according to the present invention.

Figure 1:
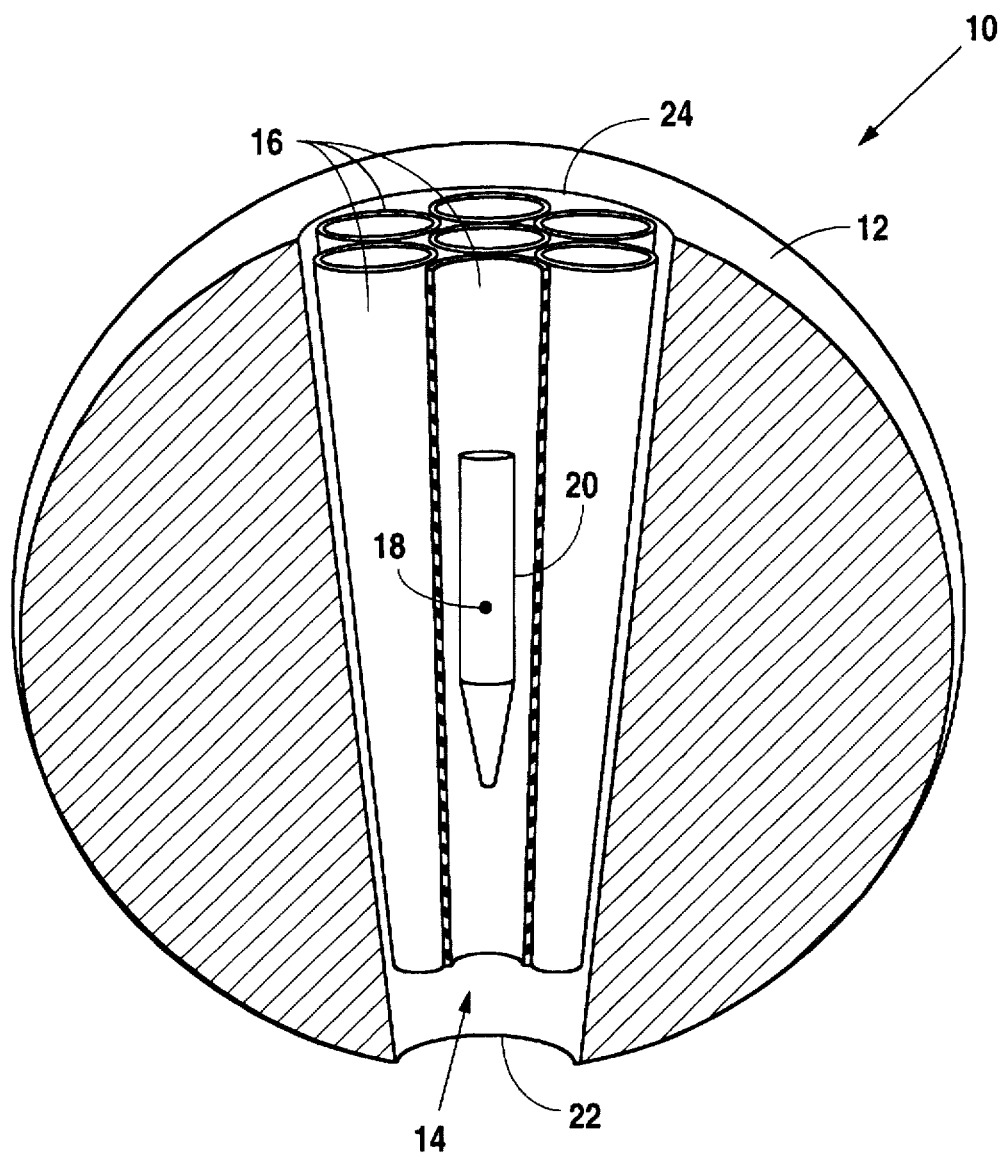
FIG. 1 is a cross-sectional view of a first embodiment of a rope end termination device according to the present invention.

The device comprises a generally spherically shaped housing member 12 with a generally frusto-conical bore 14 therethrough. Inserted in juxtaposed relationship within the bore 14 are a number of generally frusto-conical hollow members 16 which, in use, terminate respective ends of ropes of a bundle of ropes terminated by the device 10.

Each frusto-conical hollow member 16 has a conically shaped wedge member 18 associated therewith. Each wedge member 18 fits within the hollow of its respective frusto-conical hollow member 16 to wedgedly retain filaments of a rope end in a space between the wedge member and an inner wall 20 of the hollow member 16 in a like manner to the rope end connectors described in United Kingdom patent No. 1641013 and United Kingdom patent publication No. 2236546A.

The included angle of each of the hollow members 16 is less than the included angle of the housing member bore 14. The included angles of the hollow members are preferably equal and are chosen such that the hollow members 16 fit tightly within the bore 14 of the housing member 12 when arranged in juxtaposed relationship therein. In this embodiment it can be seen that the hollow members 16 have a length substantially equal to the length of the bore 14 of the housing member. It will be understood, however, that the hollow members 16 can have any suitable length dependent on factors such as rope diameter, load etc.

The ropes terminated by the hollow member/conically shaped member combinations extend away from the termination device 10 exiting said device via an aperture 22 being the narrower of two apertures (22, 24) defining the limits of the bore 14 extending through the housing member 12.

In use, load exerted on the ropes of the bundle terminated by the device 10 causes further compression of the hollow members 16 within the bore 14 of the housing member 12 thereby increasing the grip exerted on the terminated rope ends.

The housing member 12, hollow members 16 and wedge members 18 can be made of any suitable material dependent on the environment in which the termination device 10 is intended to be employed.

The rope end termination device 10 is primarily intended to be used to terminate a bundle of ropes which can be utilised in replacement of a single rope of greater diameter than any of the ropes forming the bundle. In this way, the problem of terminating a single large diameter rope can be avoided since each rope of the bundle can be separately manually terminated using a hollow member/conical member combination prior to the terminated rope end with its associated hollow member 16 being arranged in position in the bore of the housing member 12. The device 10 can be utilised to terminate a single rope comprising a number of parallel strands wherein each strand end is wedgedly retained in a hollow member 16 thereby still achieving in part the object of the invention.

When terminating a bundle of ropes, the ends of the ropes are passed through the bore 14 of the housing member 12 via the narrow aperture 22. Each rope end is terminated as previously described. The ropes are then withdrawn back through the bore 14 in order to locate the hollow members 16 within the bore. This can be manually achieved.

A typical bundle of ropes might comprise seven ropes each of approximately 96 mm in diameter. The bundle so formed would be generally equivalent to a single rope having a diameter in the order of 250 mm. The bundle of ropes may be loosely bound by an outer tubular jacket such as a polyester braided jacket to prevent entanglement.

A rope having a diameter of 250 mm can only be transported in relatively short lengths due to size limitations of the bobbin upon which the rope is wound and the weight of the bobbin and rope combination. For deep water applications requiring a large diameter rope or its equivalent, a problem is encountered in providing long lengths of sufficient diameter rope. With large diameter ropes it is necessary to construct a desired rope length from a number of sections placed in end to end relation with ends of adjacent sections joined by connection devices.

The present invention overcomes the above problems by allowing a long length bundle of narrow diameter ropes to be formed which can be utilised in replacement of a larger diameter rope but which does not require intermediate connection devices. Also, the problem of transporting said lengths of narrower diameter rope are not as acute as for a large diameter rope since the lengths can be separately transported.

The exterior of the housing member is shaped to be locatable in a fixture means. This is of particular use in deep water applications where remote means can be used to cause engagement of the termination device with a fixture means, for example attaching a mooring tether line terminated by the device to an anchorage or mooring station. The exterior of the housing may be any suitable shape for locating within a fixture means although in this embodiment the housing is generally spherical.

Figure 2:
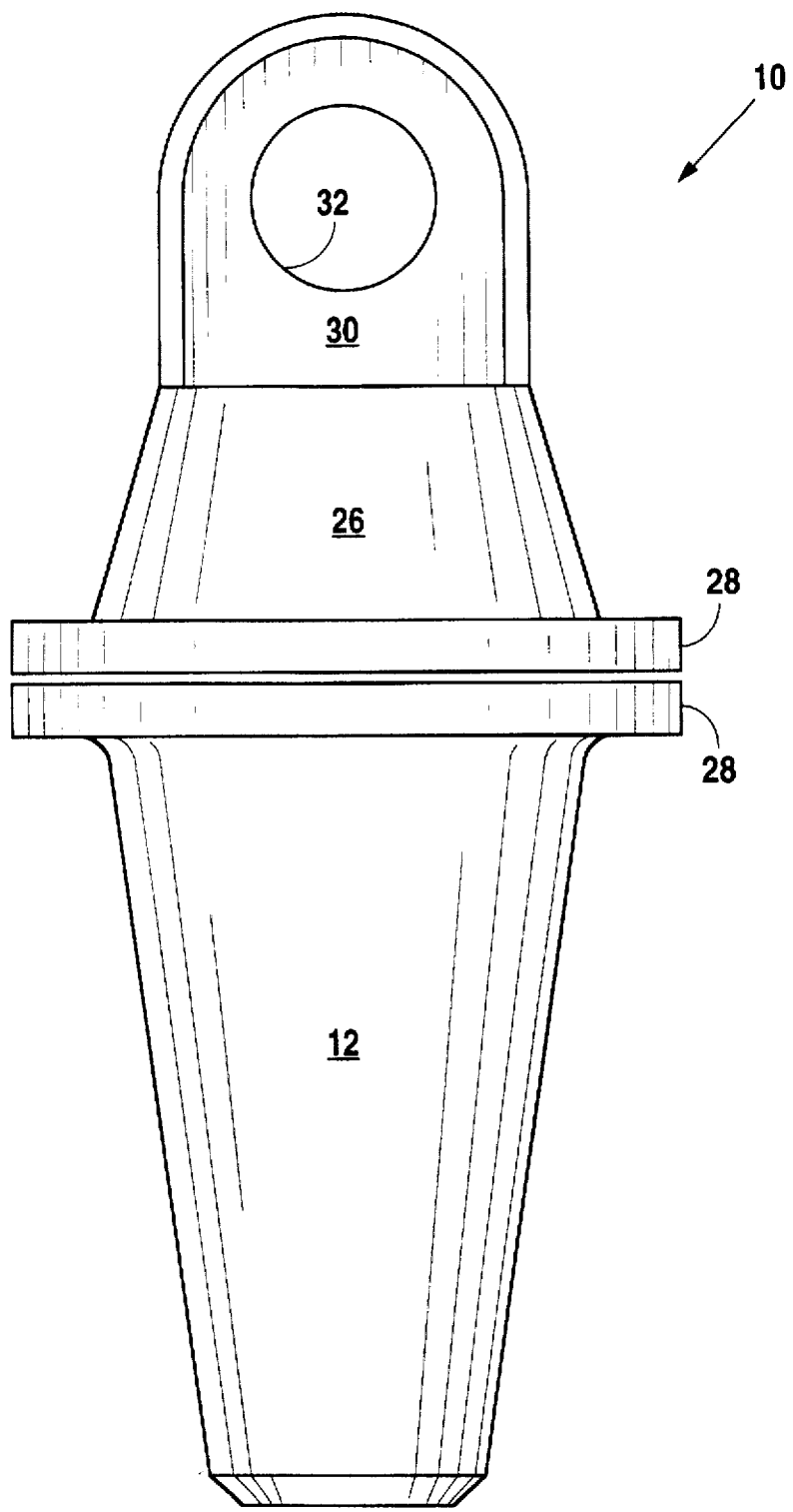
FIG. 2 is a side-elevational view of a second embodiment of a rope end termination device according to the present invention.
Figure 3:
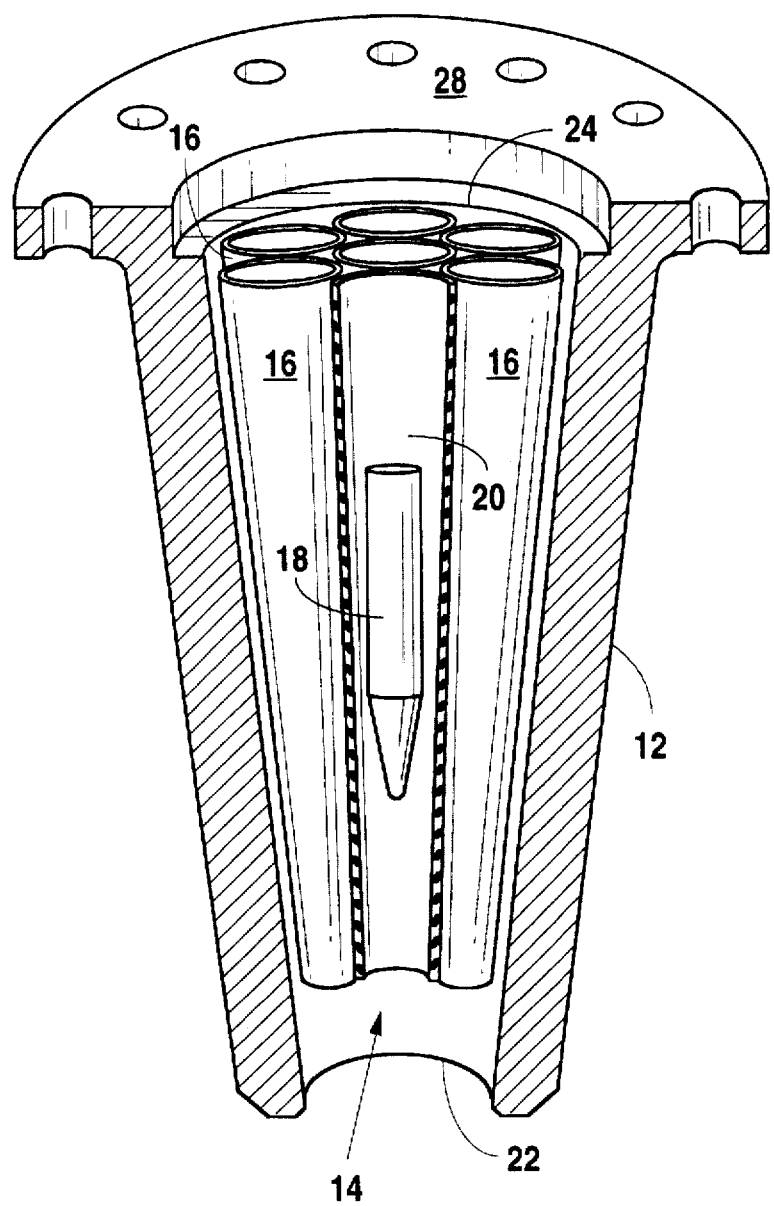
FIG. 3 is a cross-sectional view of a housing member of the rope end termination device of FIG. 2.

In a second embodiment of the termination device 10 according to the invention as depicted in FIGS. 2 and 3, the device 10 includes a housing member 12 and housing cap member 26 bolted thereto by means of bolting through complementary flanges 28. The housing cap member 26 has a lug 30 extending therefrom with an aperture 32 therethrough to allow the device to be shackled to a fixture.

It can be seen that two housing members 12 according to this embodiment could be secured together in back to back relationship by means of their flanges 28 to form an intermediary connection device for forming an even longer length bundle of ropes than that proposed.

It will be understood that the housing member of the various embodiments of the present invention will generally be substantial in size to allow termination of large diameter ropes or equivalent bundles of ropes. However, the provision of frusto-conical members which locate within the bore of the housing and wedgedly retain rope end portions or rope ends therein allows, in the main, manual termination of the rope end portions or rope ends although it will normally be necessary for the housing member to be mechanically positioned.

I claim:

1. A rope end termination device, comprising:
   a housing member having a generally frusto-conical bore;
   a plurality of generally frusto-conical members having generally frusto-conical hollow chambers wherein, in use, each rope strand of a rope end comprising multiple rope strands is passed through a respective one of said hollow chambers; and
   a plurality of wedging means, each of said wedging means corresponding to a respective one of said hollow chambers, wherein, in use, each of said wedging means wedgedly fits within its respective hollow chamber to wedgedly retain a respective rope strand therein;
   wherein the frusto-conical members are arranged in juxtaposed relationship within the bore of the housing member such that each of said frusto-conical members contacts at least one adjacent frusto-conical member and such that a load applied to the rope end acts through the multiple rope strands in a direction towards a narrower end of the housing member bore.

2. A rope end termination device as claimed in claim 1, wherein said means for wedgedly retaining each of said multiple rope strands comprises a generally conically shaped wedge member for each of said frusto-conical members, said wedge member locating, in use, within a hollow chamber of a respective one of said frusto-conical members to wedgedly retain a respective one of said multiple rope strands within a respective frusto-conical hollow chamber.

3. A rope end termination device as claimed in claim 1, further comprising a first included angle for said generally frusto-conical bore; and a second included angle for said generally frusto-conical members; wherein said second included angle is smaller than said first included angle.

4. A combination of a rope end termination device and a fixture, comprising:

> a housing member having a generally frusto-conical bore;
>
> a plurality of generally frusto-conical members having generally frusto-conical hollow chambers wherein, in use, each rope strand of a rope end comprising multiple rope strands is passed through a respective one of said hollow chambers; and
>
> a plurality of wedging means, each of said wedging means corresponding to a respective one of said hollow chambers, wherein, in use, each of said wedging means wedgedly fits within its respective hollow chamber to wedgedly retain a respective rope strand therein;
>
> wherein the frusto-conical members are arranged in juxtaposed relationship within the bore of the housing member such that each of said frusto-conical members contacts at least one adjacent frusto-conical member and such that a load applied to the rope end acts through the multiple rope strands in a direction towards a narrower end of the housing member bore, and wherein said housing member includes an external surface shaped so as to be locatable within said fixture and said fixture includes a sea bed anchorage and mooring station.

5. A combination as claimed in claim 4, wherein said means for wedgedly retaining each of said multiple rope strands comprises a generally conically shaped wedge member for each of said frusto-conical members, said wedge member locating, in use, within a hollow chamber of a respective one of said frusto-conical members to wedgedly retain a respective one of said multiple rope strands within a respective frusto-conical hollow chamber.

6. A combination as claimed in claim 4, further comprising:

> a first included angle for said generally frusto-conical bore; and
>
> a second included angle for said generally frusto-conical members;
>
> wherein said second included angle is smaller than said first included angle.

7. A combination as claimed in claim 4, wherein said housing member has a generally spherical external surface.

8. A combination as claimed in claim 4, wherein said housing member includes attaching means.

9. A method of terminating a rope end of multiple rope strands using a housing member having a generally frusto-conical bore containing a plurality of generally frusto-conical hollow members, comprising the steps of:

> passing said rope end through a narrower end of said generally frusto-conical bore of said housing member;
>
> positioning each of the multiple strands of said rope end through respective generally frusto-conical hollow members;
>
> inserting a wedge member into each of said generally frusto-conical hollow members to wedgedly retain said multiple strands therein; and
>
> drawing said multiple strands of said rope ends through said generally frusto-conical bore in order to locate said plurality of generally frusto-conical members terminating said multiple rope strand in juxtaposed relationship within said generally frusto-conical bore of said housing member;
>
> wherein a load applied to the rope end acts on the frusto-conical members in a direction towards the narrower end of the housing member bore.

* * * * *